United States Patent
Hall et al.

(10) Patent No.: US 7,794,008 B2
(45) Date of Patent: Sep. 14, 2010

(54) COLLAPSIBLE DOOR PANEL SUPPORT STRUCTURES AND METHODS OF ASSEMBLY

(75) Inventors: Ian Brewster Hall, Ann Arbor, MI (US); Brian Robert Spahn, Plymouth, MI (US); John Pinkerton, Canton, MI (US); Mangala M. Jayasuriya, Bloomfield Hills, MI (US)

(73) Assignee: Ford Global Technologies, L.L.C., Dearborn, MI (US)

( * ) Notice: Subject to any disclaimer, the term of this patent is extended or adjusted under 35 U.S.C. 154(b) by 21 days.

(21) Appl. No.: 11/946,413

(22) Filed: Nov. 28, 2007

(65) Prior Publication Data

US 2009/0134659 A1 May 28, 2009

(51) Int. Cl.
*B60J 7/00* (2006.01)
(52) U.S. Cl. .................................. 296/153
(58) Field of Classification Search ............... 296/153
See application file for complete search history.

(56) References Cited

U.S. PATENT DOCUMENTS

| | | | |
|---|---|---|---|
| 4,783,114 A | 11/1988 | Welch | |
| 5,588,692 A | 12/1996 | Gandhi et al. | |
| 5,749,600 A | 5/1998 | Yamada et al. | |
| 5,865,496 A | 2/1999 | Odan et al. | |
| 6,568,743 B1 | 5/2003 | Jayasuriya et al. | |
| 7,121,611 B2 | 10/2006 | Hirotani et al. | |

FOREIGN PATENT DOCUMENTS

JP 2004352017 12/2004

*Primary Examiner*—Joseph D Pape
(74) *Attorney, Agent, or Firm*—Shook, Hardy & Bacon L.L.P.

(57) ABSTRACT

A collapsible door support structure includes a pre-defined bend or local stiffening feature. The collapsible structure is either be incorporated into the door handle or is incorporated into a bracket that is either attached to the door handle or to the door pull cup. If in the form of a bracket, at least one end of the bracket is attached to the door inner sheet metal. The other end of the bracket may be attached to the door handle or to the door trim panel. If used as a door pull cup support bracket a portion of the bracket is fixed to the bracket. In the event of an impact upon the vehicle door, the door inner sheet metal panel is pushed horizontally in a direction that is vehicle inward. The collapsible feature of the structure formed between the door inner sheet metal and the door trim panel causes the horizontal movement to be translated into vertical or upward movement and transmitting the energy away from the vehicle occupant, thus avoiding the door trim panel from being pushed inward into the passenger area of the vehicle.

8 Claims, 10 Drawing Sheets

COLLAPSIBLE DOOR PANEL SUPPORT STRUCTURES AND METHODS OF ASSEMBLY

TECHNICAL FIELD

The present invention relates generally to collapsible door panel structures for use with vehicle doors. More particularly, the present invention relates to collapsible door panel structures for use with the door handle and the pull cup of an armrest. The collapsible door panel support structures are strong and durable under normal use but demonstrate compromised lateral stiffness in the event of a side impact.

BACKGROUND OF THE INVENTION

Side impact events in vehicles have been identified as one of the top priorities for both research and regulation with government requirements continuing to become more stringent. These additional requirements make designs for door trim systems more challenging because the occupants may impact the door trim at the pull cup or grab handle. It is known in vehicles to provide an armrest in a door typically having an integrated pull cup to allow the occupant to pull the door shut. According to the known arrangement, the pull cup, typically composed of a molded plastic, is anchored to the vehicle door inner panel by a variety of structures. In addition to being anchored to the vehicle door inner panel, the pull cup is also solidly connected to the armrest substrate This makes the area surrounding the pull cup or grab handle quite stiff, which may negatively affect occupant injury results.

The known approach to anchoring the door handle and the pull cup to both the vehicle door inner panel provides a good degree of lateral door function to the vehicle occupant while opening and, particularly, closing the door. Accordingly, a reduction in stiffness of the door trim panel in this area may improve side impact performance. However, as in so many areas of vehicle technology, there is room in the art of vehicle interior door design for an alternative configuration to known door handle and pull cup support structures which will allow the translation of horizontal force impacting the vehicle door in the event of an impact to vertical movement which deforms or buckles a portion of the pull cup support structure to thereby prevent or minimize the movement of the armrest and its associated structure vehicle inward into the passenger area.

SUMMARY OF THE INVENTION

The present invention provides an alternative arrangement to known vehicle door handle and pull cup and support structure designs. According to the present invention, a collapsible door support structure is provided with a pre-defined bend feature. According to this design, the deformation of the door inner panel is used to bend the armrest substrate prior to interaction with the occupant. If there is no impact, the shape of the armrest structure provides for a stiff structure which will aid in passing durability requirements.

The collapsible structure may either be incorporated into the door handle or may be a bracket that is either attached to the door handle or to the door pull cup. If in the form of a bracket, at least one end of the bracket is attached to the door inner sheet metal. The other end of the bracket may be attached to the door handle or to the door trim panel. If used as a door pull cup support bracket a portion of the bracket is fixed to the bracket.

In the event of an impact upon the vehicle door, the door inner sheet metal panel is pushed horizontally in a direction that is vehicle inward. The collapsible feature of the structure formed between the door inner sheet metal and the door trim panel causes the horizontal movement to be translated into vertical or upward movement with the energy being transmitted away from the vehicle occupant, thus avoiding the door trim panel from being pushed inward into the passenger area of the vehicle. The collapsible feature also reduces the lateral stiffness of the door trim subsystem.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 1:
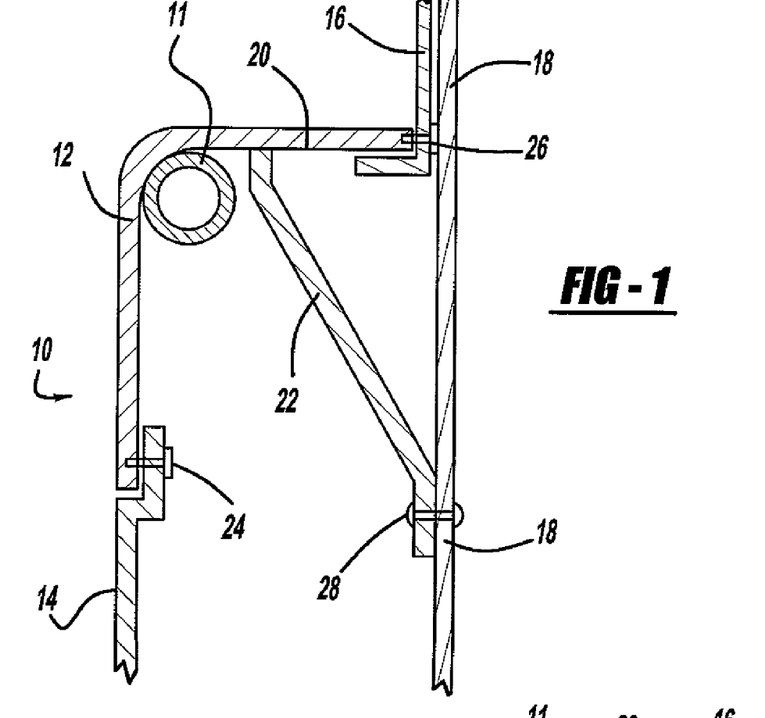
FIG. 1 illustrates a sectional view of a door handle having a collapsible area in the form of a bend feature, a supporting bracket formed between the door handle and the door inner sheet metal according to a first embodiment of the present invention.
Figure 2:
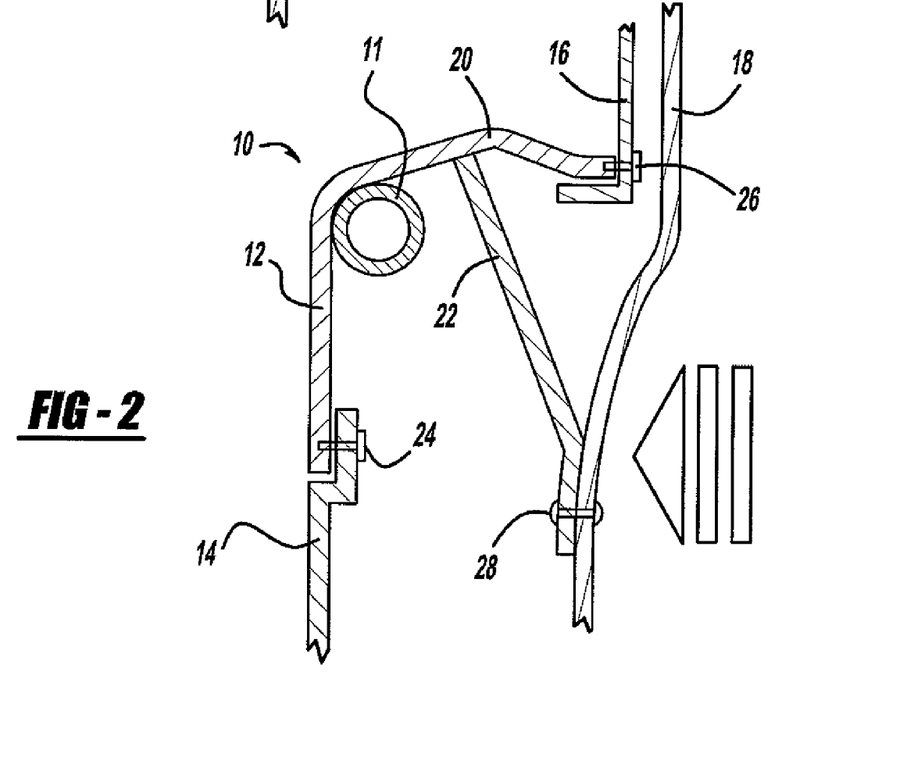
FIG. 2 illustrates the assembly of FIG. 1 but after the application of a side impact force early in the impact event.
Figure 3:
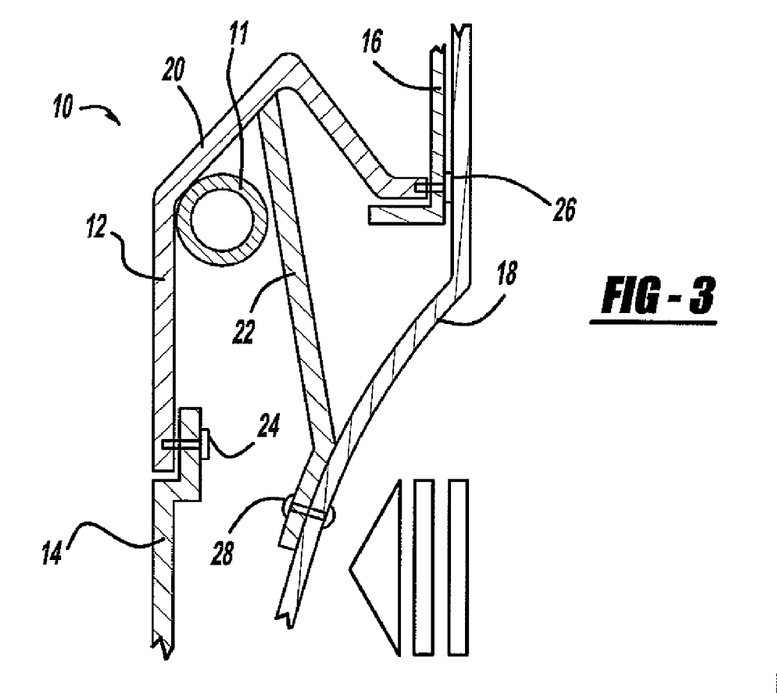
FIG. 3 illustrates the assembly of FIGS. 1 and 2 but after the application of a side impact force later in the impact event.

With reference to FIG. 1, a system using a bracket in relation to a collapsible door handle is shown. In addition, FIG. 2 and FIG. 3 illustrate two stages of impact advancement on the vehicle door.

More particularly, a sectional view of a door sub-assembly, generally illustrated as 10, is shown. The door sub-assembly 10 includes a door handle 11, a door armrest 12, a lower door trim panel 14, an upper door trim panel 16, and a door inner sheet metal 18. The door armrest 12 includes a bend feature 20 formed into the door armrest 12. A bracket 22 is provided between the door inner sheet metal 18 and the door armrest 12 at an area just adjacent to the bend feature 20. The bracket provides support for any vertical load.

The door armrest 12 is attached to the lower door trim panel 14 by any of a number of fastening methods, but may particularly be attached by a heat stake 24. The door armrest 12 is attached to the upper trim panel 16 by any of a number of fastening methods, but particularly may be attached by a heat stake 26. The bracket 22 is attached to the door inner sheet metal 18 by any of a number of fastening methods, but particularly may be attached by a mechanical fastener 28. While the fasteners 24 and 26 are illustrated as being of the heat stake variety and the fastener 28 is illustrated as a mechanical fasteners, a variety of fastening methods may be employed, such as nuts, bolts, rivets, snap fittings and the like as known to those skilled in the art.

The bend feature 20 may be a weakened area at which an upward buckle (caused by upward movement bracket 22) is formed in the event of an impact on the door inner sheet metal 18. The bend feature 20 may be formed by any of a variety of methods, such methods including but not being limited to the formation of a groove in the underside of the door armrest 12 or the formation of a slot in the underside of the door armrest 12. The presence of the bend feature 20 notwithstanding, the durability of the door armrest 12 and hence the entire door sub-assembly 10 is not significantly impacted by the presence of the bend feature 20 and thus relevant vehicle impact testing standards can still be met or exceeded.

In FIG. 1 the door sub-assembly 10 is illustrated prior to an impact event. Early in the impact event, as shown in FIG. 2, the door inner sheet metal 18 begins to deform. That deformation pushes the bracket 22, which stresses the door armrest 12, causing the door armrest 12 to bend at the bend area 20. Later in the impact event, as illustrated in FIG. 3, the bracket 22 has pushed the area of the door armrest 12 adjacent the bend feature 20 further upwards, yet the lower door trim panel 14 and the adjacent portion of the door armrest 12 has not moved vehicle-inward.

Figure 4:
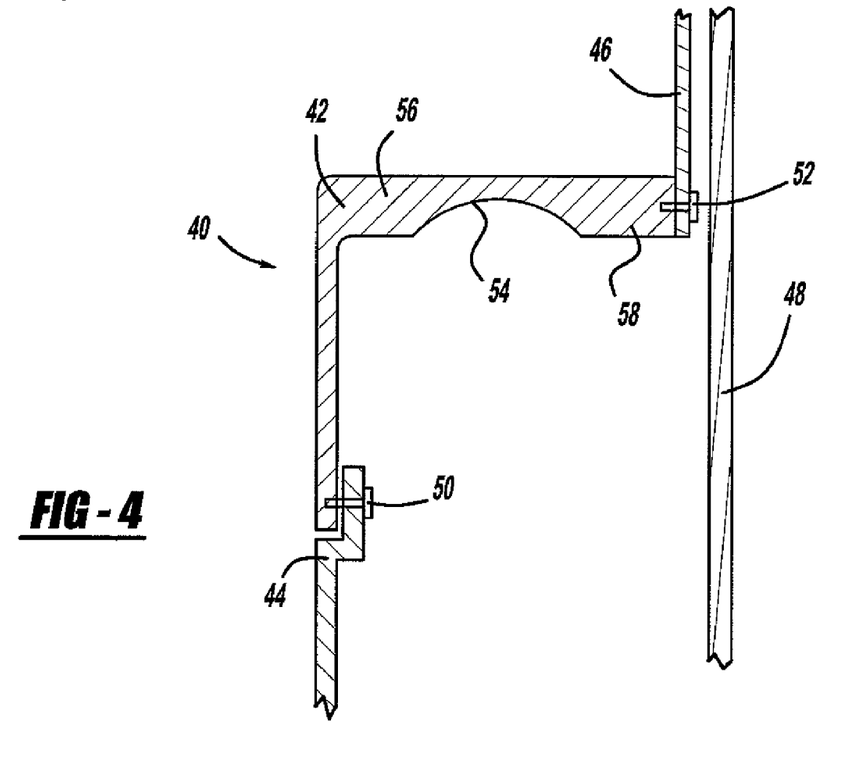
FIG. 4 illustrates a sectional view of the door armrest having a local weakening feature and the door inner sheet metal assembly according to a second embodiment of the present invention.

While FIGS. 1 through 3 illustrate a first embodiment of the collapsible door assembly of the present invention, other structures are envisioned. One such alternate embodiment is illustrated in FIG. 4 in which a sectional view of a door sub-assembly, generally illustrated as 40, is shown. The door sub-assembly 40 includes a door armrest 42, a lower door trim panel 44, an upper door trim panel 46, and a door inner sheet metal 48. The door armrest 42 is attached to the lower door trim panel 44 by a fastener such as a heat stake 50. The door armrest 42 is also attached to the upper door trim panel 46 by a fastener such as a heat stake 52.

To provide for collapsibility, the door armrest 42 includes an area of local weakness 54 which provides the bending feature for this embodiment. The area of local weakness 54 is provided adjacent a first local stiffness feature 56 and a second local stiffness feature 58. In the event of a side impact, the area of local weakness 54 bends upward under the load of the side impact and away from the vehicle occupant, thus minimizing if not entirely eliminating vehicle inward movement of the lower door trim panel 44 and the portion of the door armrest 42 adjacent the lower door trim panel 44.

Figure 5:
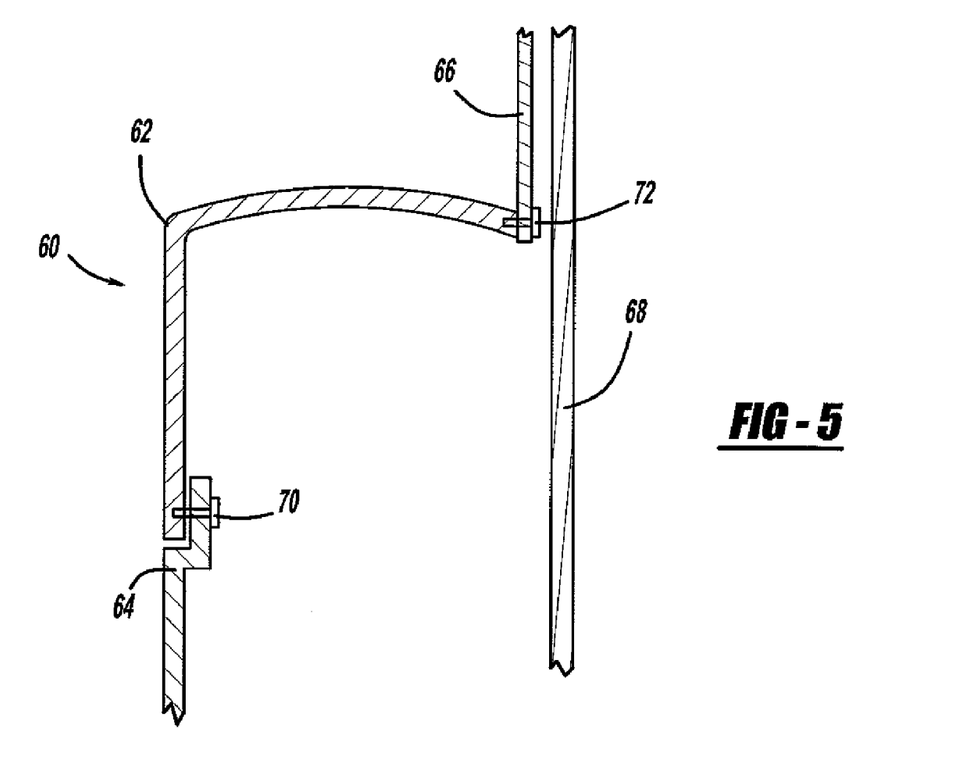
FIG. 5 illustrates a sectional view of the pre-bent door armrest according to a third embodiment of the present invention.

An additional embodiment of the collapsible door assembly of the disclosed invention is illustrated in FIG. 5 in which a sectional view of a door sub-assembly, generally illustrated as 60, is shown. The door sub-assembly 60 includes a door armrest 62, a lower door trim panel 64, an upper door trim panel 66, and a door inner sheet metal 68. The door armrest 62 is attached to the lower door trim panel 64 by a fastener such as a heat stake 70. The door armrest 62 is also attached to the upper door trim panel 46 by a fastener such as a heat stake 72.

To provide for collapsibility, the door armrest 62 is pre-bent as illustrated to form an arcuate configuration. In the event of a side impact, the pre-bent door armrest 62 bends upward under the load of the side impact and away from the vehicle occupant, thus minimizing if not entirely eliminating vehicle inward movement of the lower door trim panel 64 and the portion of the door armrest 62 adjacent the lower door trim panel 64.

Other designs of the disclosed invention include hinge features that collapse upon lateral impact with either the intruding door sheet metal or upon impact with the occupant. In general, the vertical movement lowers the overall stiffness by reducing the stack-up condition, thus increasing the crush space available. Both a reduction in stiffness and an increase in overall crush space have shown to provide a benefit to occupant protection.

Figure 6:
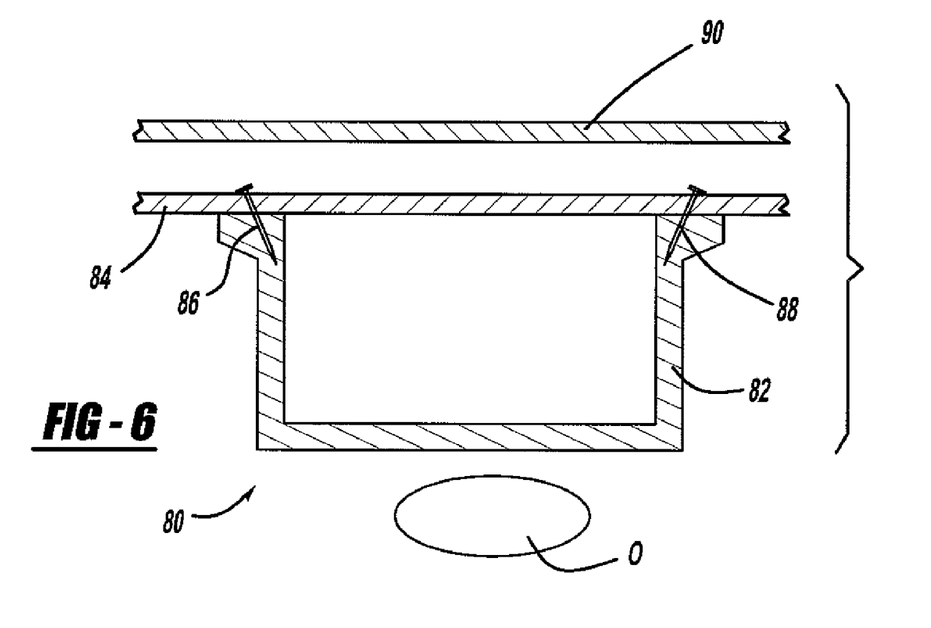
FIG. 6 illustrates a sectional view of the door handle having collapsible features in relation to the door inner sheet metal according to a fourth embodiment of the present invention.
Figure 7:
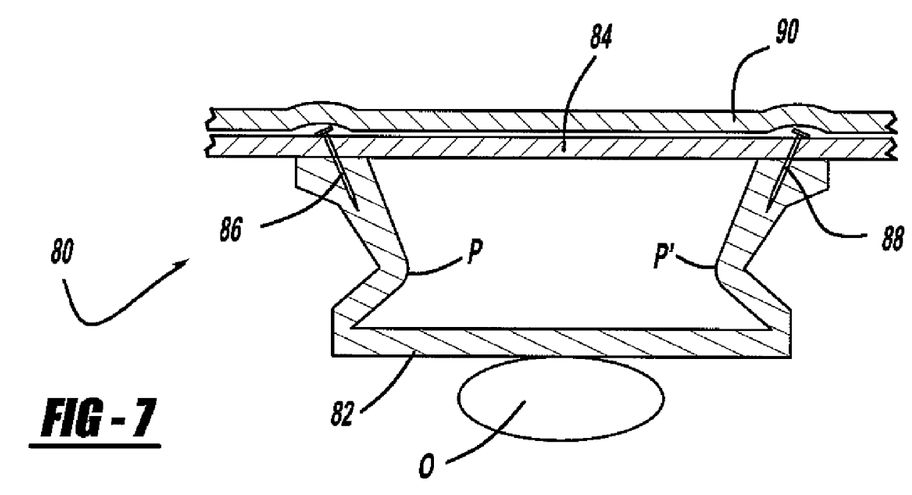
FIG. 7 illustrates the assembly of FIG. 6 but after the application of a side impact force.

One such alternate design is shown in FIGS. 6 and 7 in which a sectional view of a door handle having collapsible features is shown in relation to the door inner sheet metal. In FIG. 6 this structure is shown before a side impact, while in FIG. 7 this structure is shown after a side impact.

In particular, a door sub-assembly, generally illustrated as 80, is shown in relation to an occupant "O". The door sub-assembly 80 includes a door handle 82 fixed to a door trim panel 84 by a first off-axis fastener 86 and a second off-axis fastener 88. A door inner sheet metal 90 is adjacent the door trim panel 84.

On impact, as illustrated in FIG. 7, the positions of the off-axis fastener 86 and the off-axis fastener 88 cause the force of the intruding door inner sheet metal 90 to be distributed away from the occupant O due to the creation of bend points P and P'.

As a further approach to reducing the vehicle-inward movement of the door handle of the vehicle it is proposed herein to alter the construction of the pull cup support bracket. Some modifications to the pull cup support bracket have been set forth in U.S. Ser. No. 11/744,527, titled "Deformable Pull Cup Arrangement and Method of Assembly," assigned to the same assignee as the present application, and incorporated by reference herein.

Figure 8:
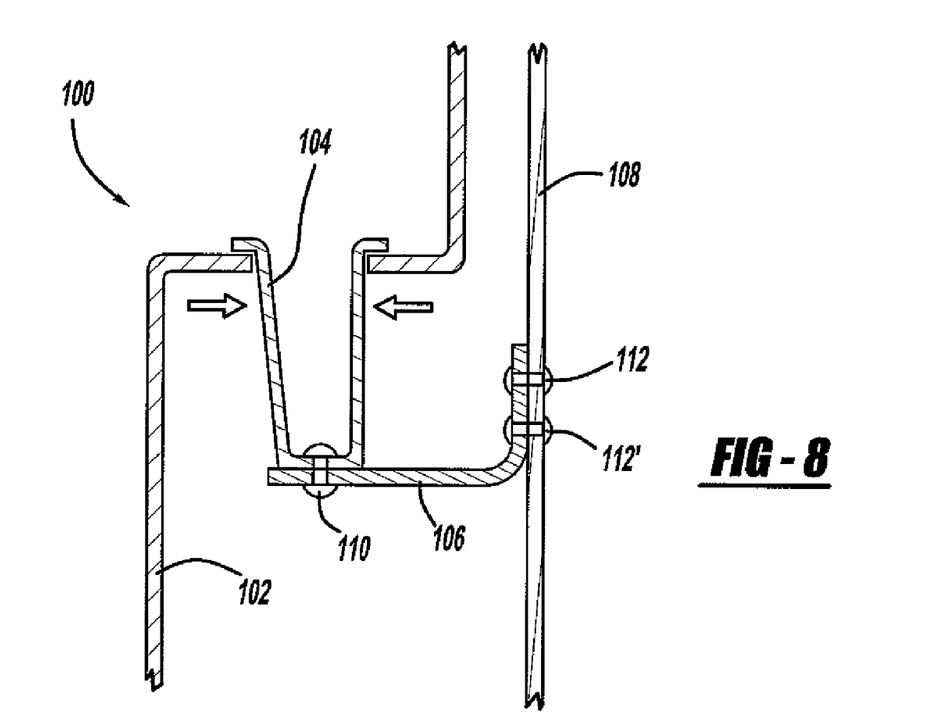
FIG. 8 is a sectional view of a pull cup and supporting bracket according to known technology.

A typical pull cup arrangement is shown in FIG. 8 in which a sectional view of a door sub-assembly 100 of the prior art is illustrated. The door sub-assembly 100 includes a door trim panel substrate 102, a pull cup 104, a pull cup supporting bracket 106 and a door inner sheet metal panel 108. The pull cup 104 is fixedly attached to the supporting bracket 106 by a fastener 110. The supporting bracket 106 is fixedly attached to the door inner sheet metal panel 108 by a pair of fasteners 112 and 112'.

The pull cup supporting bracket 106 is of the typical L-shape having a simple 90° bend. This design does not allow significant relative movement between the pull cup 104, the door trim panel substrate 102, and the pull cup supporting bracket 106. When the pull cup 104 is locked into its pre-impact position (as illustrated), a stack-up condition may occur between the pull cup 104 and the horizontal sections of the door trim substrate 100 as illustrated by the arrows.

The pull cup brackets disclosed herein overcome the limitations of the known bracket arrangement. Several non-limiting examples are provided. Particularly, and with respect first to FIGS. 9 and 10, a pull cup bracket arrangement is illustrated in its pre-impact and post-impact positions, respectively. With reference to these figures, a door sub-assembly, generally illustrated as 120, is shown. The door sub-assembly 120 includes a door trim panel substrate 122, a pull cup 124, a pull cup supporting bracket 126 and a door inner sheet metal panel 128. The pull cup 124 is fixedly attached to the supporting bracket 126 by a fastener 130. The supporting bracket 126 is fixedly attached to the door inner sheet metal panel 128 by a pair of fasteners 132 and 132'. The supporting bracket 126 is also fixedly attached to the door trim panel substrate 122 by a fastener 134.

Figure 9:
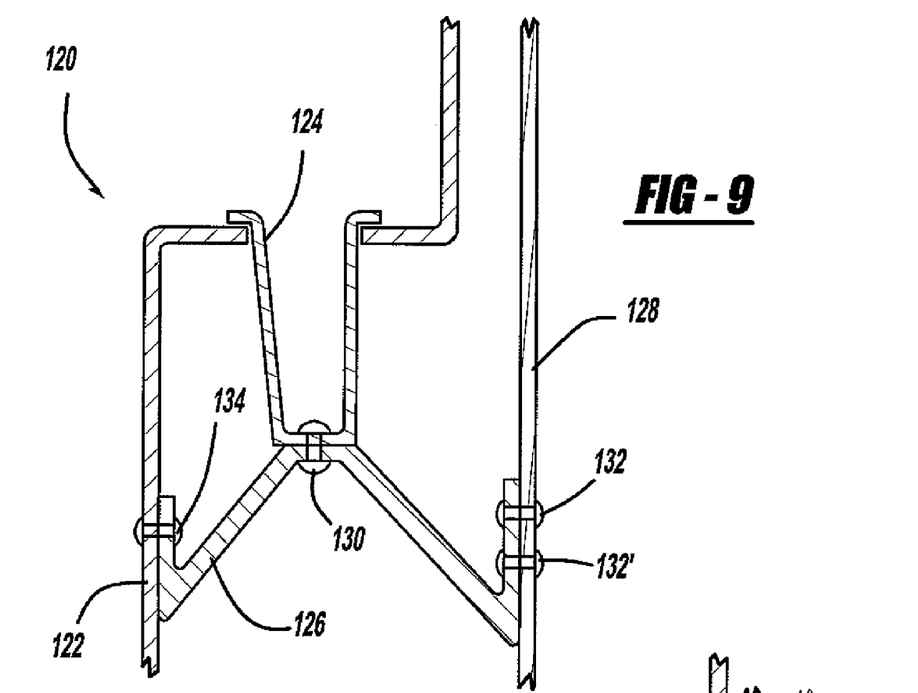
FIG. 9 is a sectional view of pull cup having a collapsible pull cup bracket in relation to the door trim and the door inner sheet metal according to a fifth embodiment of the pull cup bracket of the instant invention.
Figure 10:
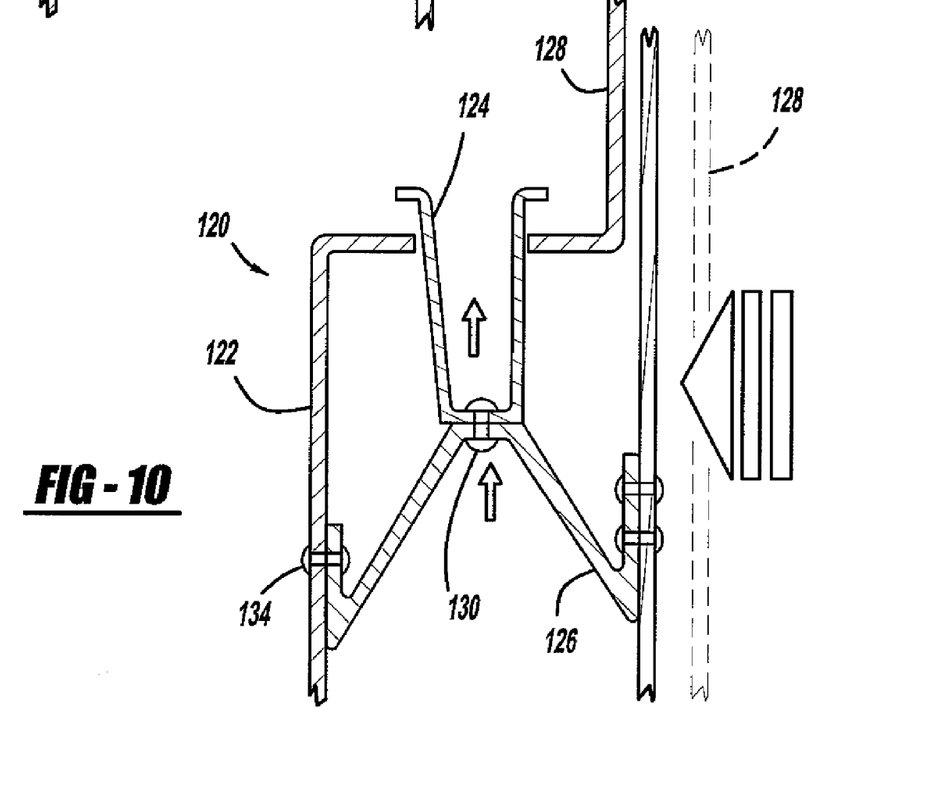
FIG. 10 illustrates the assembly of FIG. 9 but after the application of a side impact force.

As noted above, the door sub-assembly 120 is shown in its pre-impact state in FIG. 9. After impact, and as illustrated in FIG. 10, the door inner sheet metal panel 128 is moved vehicle inward. However, instead of a stack-up condition occurring, the angular configurations of the pull cup supporting bracket 126 drives the pull cup 124 upward and the door trim panel substrate 122 is left substantially intact by the distribution of the vehicle-inward impact energy away from the vehicle occupant.

Figure 11:
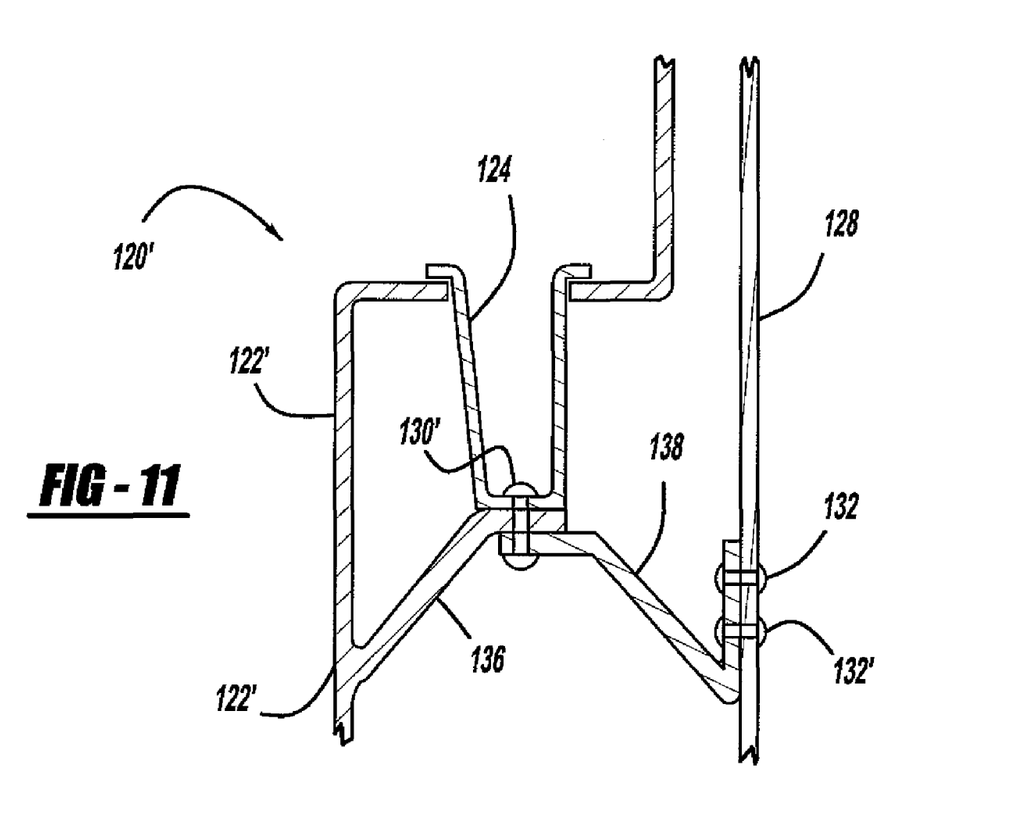
FIG. 11 illustrates an assembly similar to that of FIG. 9 but the collapsible pull cup bracket is separated into two distinct parts, with the in-board portion of the bracket being integrally molded into the door trim substrate.

An alternate embodiment of the pull cup supporting bracket 126 is illustrated in FIG. 11. With reference thereto, a door sub-assembly 120' is shown with a door trim panel substrate 122'. The pull cup supporting bracket is separated into two independent sections including an inboard pull cup supporting bracket portion 136 and an outboard pull cup supporting bracket portion 138. A fastener 130' is provided to fasten the pull cup 124 to the inboard pull cup supporting bracket portion 136 and the outboard pull cup supporting bracket 138. The inboard pull cup supporting bracket portion 136 is integrally molded with the door trim panel substrate 122' while the outboard pull cup supporting bracket portion 138 is fixedly attached to the door inner sheet metal panel 128 by the pair of fasteners 132 and 132'. The functionality of the arrangement of FIG. 11 is substantially identical to the design shown in FIGS. 9 and 10.

Figure 12:
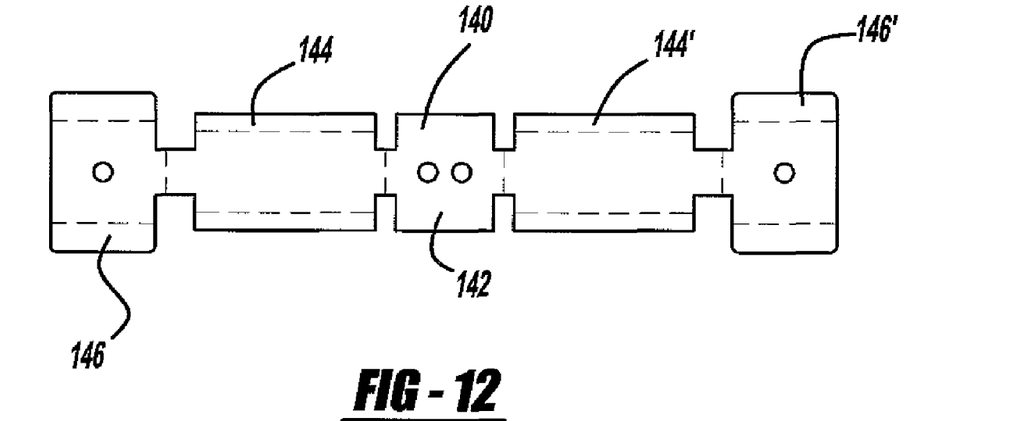
FIG. 12 illustrates a plan view of a variation of the pull cup bracket for use in a sixth embodiment of the disclosed invention after being stamped but prior to its being shaped.
Figure 13:
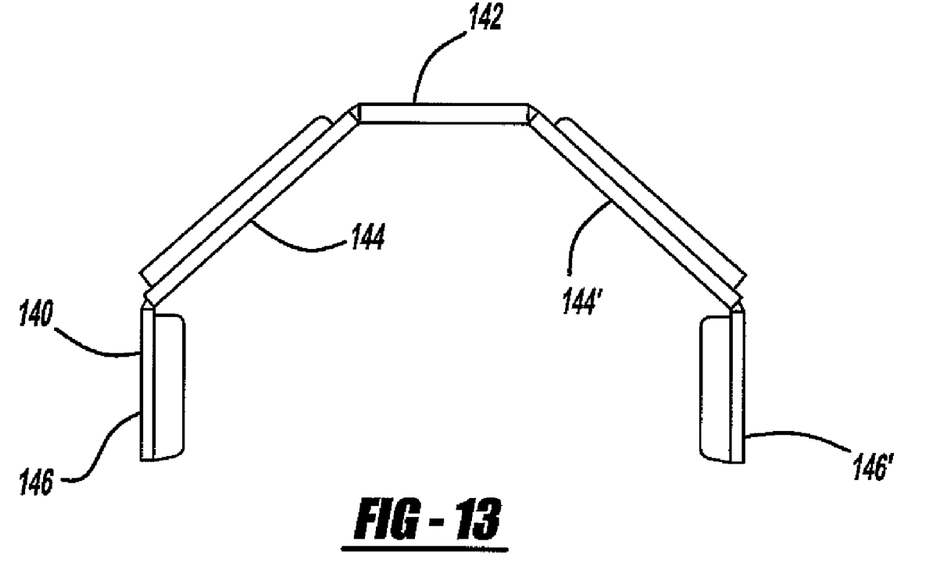
FIG. 13 illustrates a side view of the pull cup bracket of FIG. 12 after being shaped.
Figure 14:
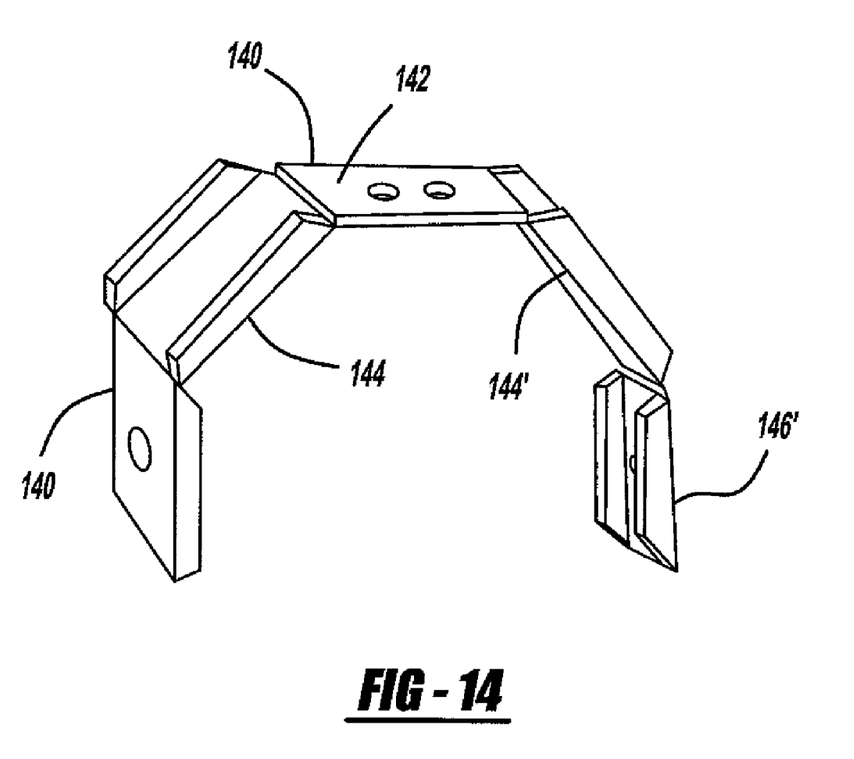
FIG. 14 illustrates a perspective view of the pull cup bracket of FIG. 12 after being shaped.

There are a number of variations of pull cup brackets that may be used in the present invention. One such bracket is illustrated in FIGS. 12 through 14 and is shown in use in a further alternate embodiment of the disclosed invention, illustrated in FIG. 15. A bracket 140 is shown in FIG. 12 in its stamped, pre-bent stage. The bracket 140 includes a central part 142, a pair of intermediate parts 144 and 144', and a pair of end plates 146 and 146'. Each of the intermediate parts 144 and 144' includes flanges along their long axes. Similarly each of the end plates 146 and 146' includes flanges along their long axes. The flanges are bent to prevent the bracket 140 from bending downward upon lateral loading. Additional stiffening and weakening features may be added to the bracket 140 to insure that it bends in the desired locations.

The finished bracket 140 is illustrated in FIGS. 13 and 14. Appropriate bends have been made between the central part 142, the intermediate parts 144 and 144', and the end plates 146 and 146'. In addition, the flanges have been bent to their final positions.

Figure 15:
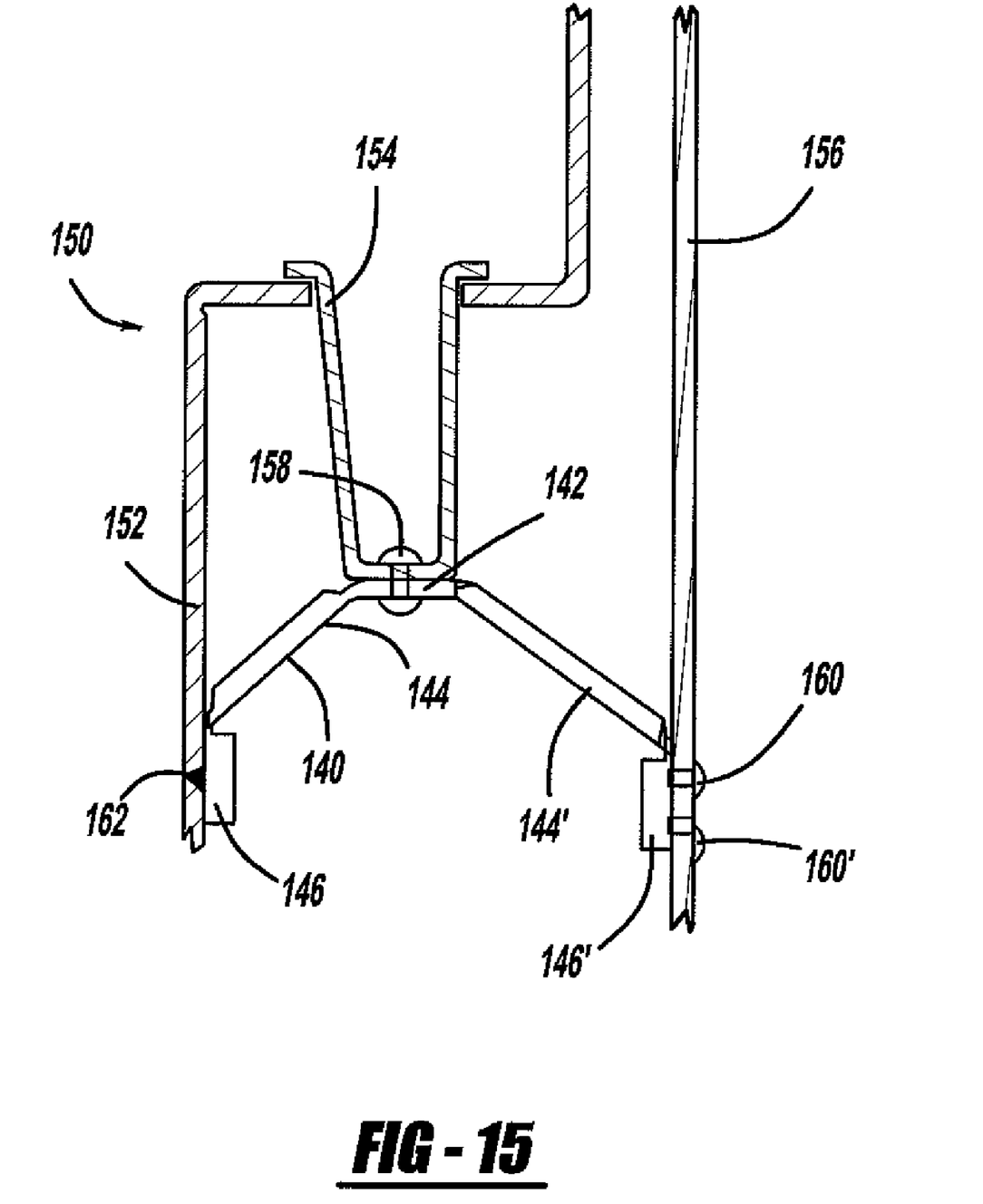
FIG. 15 is a sectional view of a pull cup assembly which utilizes the pull cup bracket of FIGS. 12 through 14.

In FIG. 15 the bracket 140 is shown in place in a door sub-assembly 150. The door sub-assembly 150 includes a door trim panel substrate 152, a pull cup 154 and a door inner sheet metal panel 156. The pull cup 154 is fixedly attached to the supporting bracket 140 by a fastener 158. The supporting bracket 140 is fixedly attached to the door inner sheet metal panel 156 by a pair of fasteners 160 and 160'. The supporting bracket 140 is also fixedly attached to the door trim panel substrate 152 by a fastener 162. On impact (not shown), the door inner sheet metal panel 156 is moved vehicle inward, effectively pinching the bracket 140 between the door trim panel substrate 152 and the door inner sheet metal panel 156 and moving the pull cup 154 upward. According to this arrangement the vehicle-inward movement of the door trim panel substrate 152 is limited if not fully eliminated.

Figure 16:
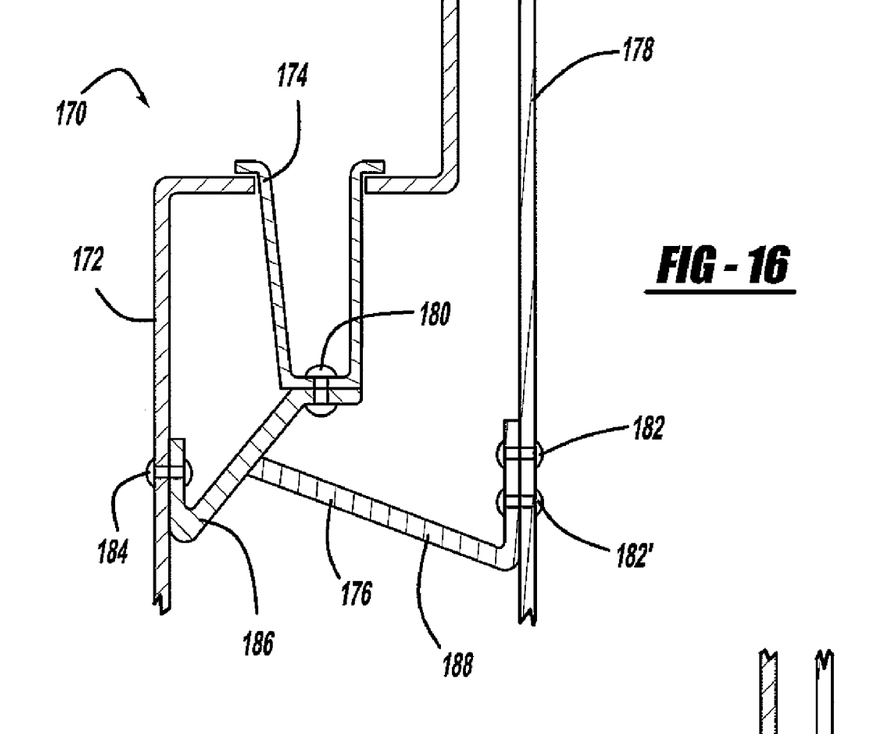
FIG. 16 is a sectional view of pull cup having a collapsible pull cup bracket in relation to the door trim and the door inner sheet metal according to a seventh embodiment of the pull cup bracket of the instant invention.

An alternative construction of a pull cup bracket designed to avoid vehicle-inward movement of the door trim panel substrate is illustrated in FIG. 16. As shown, a door sub-assembly, generally illustrated as 170, is shown. The door sub-assembly 170 includes a door trim panel substrate 172, a pull cup 174, a pull cup supporting bracket assembly 176, and a door inner sheet metal panel 178. The pull cup 174 is fixedly attached to the supporting bracket assembly 176 by a fastener 180. The supporting bracket assembly 176 is attached to the door inner sheet metal panel 178 by a pair of fasteners 182 and 182'. The supporting bracket assembly 176 is also fixedly attached to the door trim panel substrate 172 by a fastener 184.

The supporting bracket assembly 176 includes two components, a first supporting bracket portion 186 fitted between the door trim panel substrate 172 and the pull cup 174 and a second supporting bracket portion 188 fitted between the first supporting bracket portion 186 and the door inner sheet metal panel 178.

On impact (not shown), the door inner sheet metal panel 178 is moved vehicle inward, effectively pinching the bracket 176 between the door trim panel substrate 172 and the door inner sheet metal panel 178 and moving the pull cup 174 upward. The door trim panel substrate 172 accordingly does not move vehicle inward substantially if at all.

Figure 17:
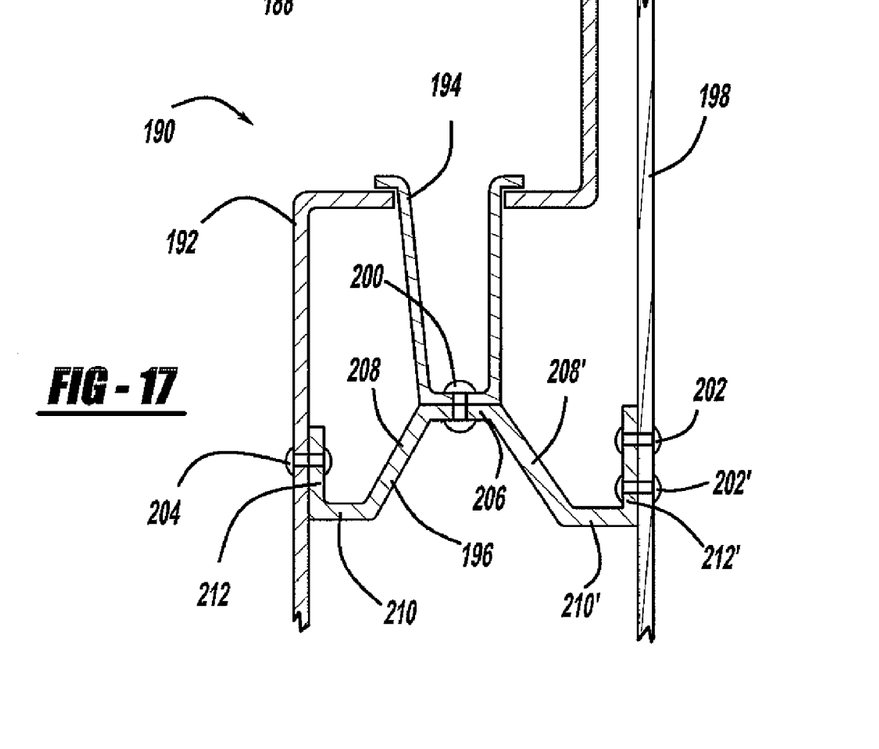
FIG. 17 is a sectional view of pull cup having a collapsible pull cup bracket in relation to the door trim and the door inner sheet metal according to a eighth embodiment of the pull cup bracket of the instant invention.

Still another embodiment of the pull cup bracket of the present invention is shown in FIG. 17. With reference to that figure, a door sub-assembly 190 is shown. The door sub-assembly 190 includes a door trim panel substrate 192, a pull cup 194, a pull cup bracket 196, and a door inner sheet metal panel 198. The pull cup 194 is fixedly attached to the supporting bracket 196 by a fastener 200. The supporting bracket 196 is fixedly attached to the door inner sheet metal panel 198 by a pair of fasteners 202 and 202'. The supporting bracket 196 is also fixedly attached to the door trim panel substrate 192 by a fastener 204.

The pull cup bracket 196 includes a central portion 206, a pair of angled portions 208 and 208', a pair of substantially parallel portions 210 and 210', and a pair of connecting plates 212 and 212'. The connecting plate 212 is fixed to the door trim panel substrate 192 by the fastener 204. The connecting plate 212' is fixed to the door inner sheet metal panel 198 by the pair of fasteners 202 and 202'.

On impact (not shown), the door inner sheet metal panel 198 is moved vehicle inward, effectively pinching the bracket 196 between the door trim panel substrate 192 and the door inner sheet metal panel 198. This action moves the pull cup 194 upward thus entirely preventing or at least minimizing the vehicle-inward movement of the door trim panel substrate 192.

Figure 18:
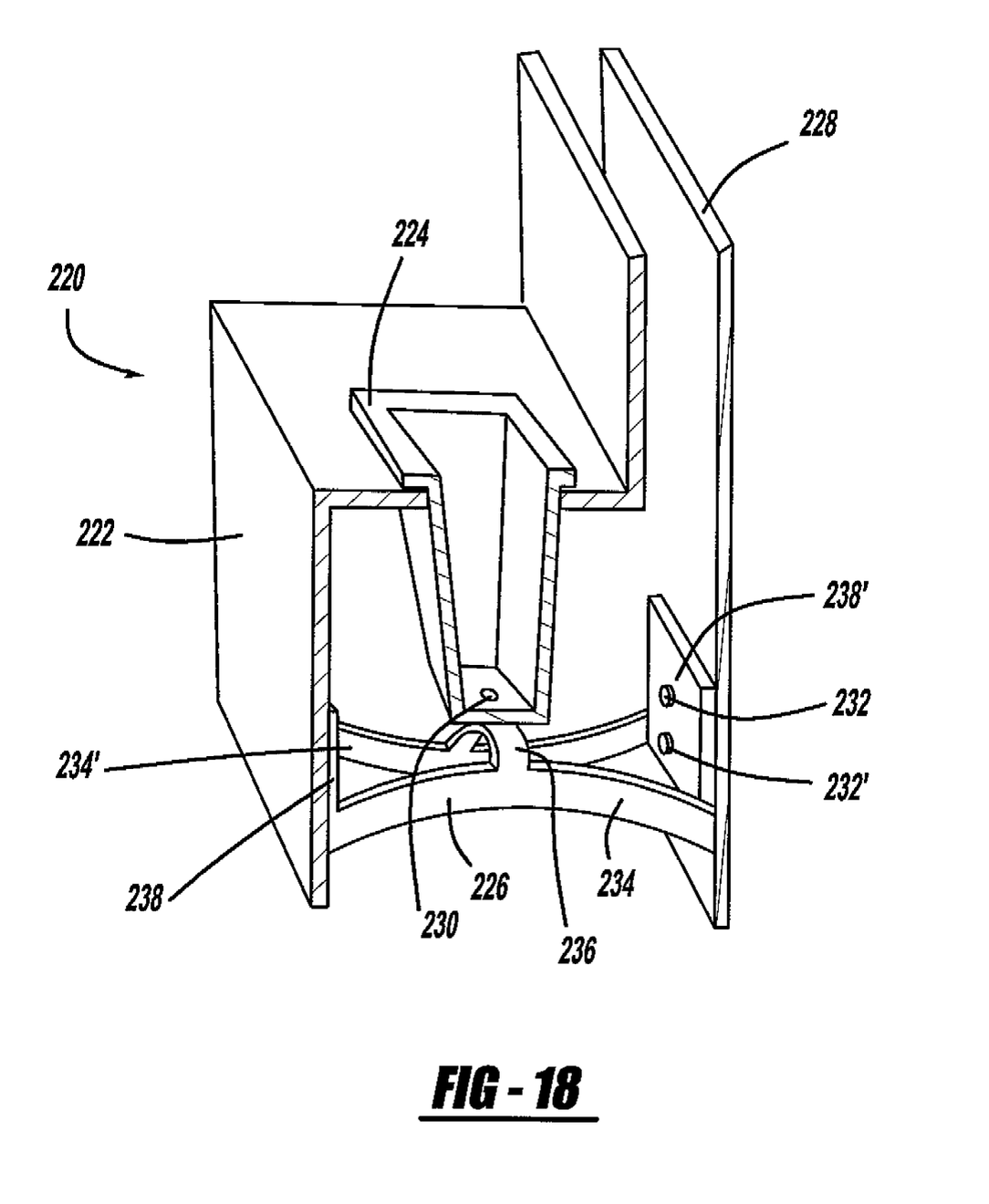
FIG. 18 is a perspective view of pull cup having a collapsible pull cup bracket in relation to the door trim and the door inner sheet metal according to an ninth embodiment of the pull cup bracket of the instant invention.

An additional embodiment of the pull cup bracket of the present invention is shown in FIG. 18 in which a door sub-assembly, generally illustrated as 220, is shown. The door sub-assembly 220 includes a door trim panel substrate 222, a pull cup 224, a pull cup bracket 226, and a door inner sheet metal panel 228. The pull cup 224 is fixedly attached to the supporting bracket 226 by a fastener 230. The supporting bracket 226 is fixedly attached to the door inner sheet metal panel 228 by a pair of fasteners 232 and 232'. The supporting bracket 226 is also fixedly attached to the door trim panel substrate 222 by a fastener (not shown).

The pull cup bracket 226 includes a first arcuate arm 234 and a second arcuate arm 234'. The arcuate arms 234 and 234' are joined at their approximate centers by a bridge 236. The bridge 236 is attached to the pull cup 224 by the fastener 230. The pull cup bracket 226 further includes a first end plate 238 and a second end plate 238'. One end of each of the arcuate arms 234 and 234' is fixed to the first end plate 238 and the other end of each of the arcuate arms 234 and 234' is fixed to the second end plate 238'. The first end plate 238 is fixed to the door trim panel 222 by a fastener (not shown). The second end plate 238' is fixed to the door inner sheet metal 228 by the fasteners 232 and 232'.

On impact (not shown), the door inner sheet metal panel 228 is moved vehicle inward. On this movement the supporting bracket 226 is squeezed between the door trim panel substrate 222 and the door inner sheet metal 228 such that the approximate middles of the arcuate arms 234 and 234' move toward one another, crimping the bridge 236, and moving the pull cup 224 upward. The door trim panel substrate 222 is thus prevented entirely or substantially from moving vehicle inward.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A door assembly for use in a vehicle comprising:
   an armrest having a substantially horizontal portion, said substantially horizontal portion having an inner edge having a thickness, an outer edge having a thickness and a central area formed between said inner edge and said outer edge, said substantially horizontal portion having a weakened area, said weakened area having a width, said thickness of said inner edge and said outer edge being at least twice said width of said weakened area; and
   a door inner sheet metal panel next to said outer edge of said armrest.

2. The door assembly of claim 1 wherein said weakened area is an area that is thinner than adjacent areas.

3. The door assembly of claim 2 wherein said substantially horizontal portion of said armrest includes an underside and wherein said weakened area is defined by a generally concave area defined in said underside of said armrest.

4. The door assembly of claim 1 wherein said weakened area defines a curve.

5. The door assembly of claim 1 further including a side trim panel connected to said inner edge.

6. The door assembly of claim 5 wherein said side trim panel is thinner than said inner edge.

7. The door assembly of claim 1 further including an upper door trim panel connected to said outer edge.

8. The door assembly of claim 7 wherein said upper door trim panel is thinner than said outer edge.

\* \* \* \* \*